(12) United States Patent
Aronov

(10) Patent No.: US 12,338,501 B2
(45) Date of Patent: Jun. 24, 2025

(54) CONTINUOUS INTENSIVE QUENCHING APPARATUS

(71) Applicant: Ajax Tocco Magnethermic Corporation, Warren, OH (US)

(72) Inventor: Michael Aronov, Solon, OH (US)

(73) Assignee: Ajax Tocco Magnethermic Corporation, Warren, OH (US)

(*) Notice: Subject to any disclaimer, the term of this patent is extended or adjusted under 35 U.S.C. 154(b) by 0 days.

(21) Appl. No.: 18/208,375

(22) Filed: Jun. 12, 2023

(65) Prior Publication Data
US 2023/0374619 A1  Nov. 23, 2023

Related U.S. Application Data

(62) Division of application No. 17/085,537, filed on Oct. 30, 2020, now Pat. No. 12,031,189.

(60) Provisional application No. 62/934,229, filed on Nov. 12, 2019.

(51) Int. Cl.
| | |
|---|---|
| *C21D 1/63* | (2006.01) |
| *B65G 15/30* | (2006.01) |
| *B65G 47/18* | (2006.01) |
| *B65G 49/04* | (2006.01) |

(52) U.S. Cl.
CPC ............ *C21D 1/63* (2013.01); *B65G 15/30* (2013.01); *B65G 47/18* (2013.01); *B65G 49/04* (2013.01); *B65G 2203/025* (2013.01); *B65G 2811/095* (2013.01)

(58) Field of Classification Search
CPC .............. B65G 15/30; B65G 2203/025; B65G 2811/095; B65G 47/18; B65G 49/04; C21D 1/63
See application file for complete search history.

(56) References Cited

U.S. PATENT DOCUMENTS

| | | | |
|---|---|---|---|
| 3,888,471 A | 6/1975 | Coch | |
| 4,036,478 A | 7/1977 | Smith et al. | |

FOREIGN PATENT DOCUMENTS

| | | | |
|---|---|---|---|
| KR | 910006550 Y1 * | 8/1991 | |
| WO | WO-0063448 A1 * | 10/2000 | ............... C21D 1/18 |

OTHER PUBLICATIONS

Office Action for U.S. Appl. No. 17/085,537, dated Jul. 5, 2023, 17 pages.

* cited by examiner

*Primary Examiner* — Anthony M Liang
*Assistant Examiner* — Jacob J Gusewelle
(74) *Attorney, Agent, or Firm* — Lippes Mathias LLP

(57) ABSTRACT

An intensive quenching (IQ) apparatus and method of quenching heated parts is provided. The IQ apparatus includes a chute for placing parts into a tank including liquid quenchant. The parts fall through the quenchant in the chute and are received by a conveyor belt. The parts are then transported on the conveyor through an inner channel of a conduit. An agitation rate of the quenchant in the inner channel is increased by an agitator.

6 Claims, 3 Drawing Sheets

CONTINUOUS INTENSIVE QUENCHING APPARATUS

CROSS-REFERENCE TO RELATED APPLICATIONS

This application is a divisional of and claims the benefit of U.S. Ser. No. 17/085,537 filed on Oct. 30, 2020 and entitled "CONTINUOUS INTENSIVE QUENCHING APPARATUS", which is herein incorporated by reference in its entirety. In addition, this application claims the benefit of U.S. 62/934,229 filed on Nov. 12, 2019, which is herein incorporated by reference in its entirety.

TECHNICAL FIELD

The present disclosure relates generally to metal fabrication and more particularly to heat treating metal.

BACKGROUND

Metal components are often heat treated. After leaving the heat-treating furnace, the metal components may be quenched in a tank. For example, hot parts may fall from a continuous heat-treating furnace belt through a quenching liquid (also referred to as a quenchant) in a tank and onto a conveyor belt that transports the parts from the quench tank. Hot forgings and hot formed parts can be also quenched in a tank right after forging or hot forming operations are completed. Common quenchants are oil or water.

SUMMARY

The present disclosure provides an apparatus for intensively quenching parts using a conveyor that is partially located in a conduit and where an agitation rate of quenchant in the conduit is increased by an agitator.

According to one aspect of the disclosure, there is provided an intensive quenching apparatus for cooling heated parts. The apparatus includes a tank containing a quenchant, a chute, a conveyor, a conduit, and an agitator. The chute is configured to deliver the parts into the quenchant. The chute is at least partially filled with quenchant. The conveyor is at least partially submerged in the quenchant and is configured to both receive the parts from an exit of the chute and to transport the received parts towards an exit from the quenchant. The conduit has an internal passage. A portion of the conveyor is located within the internal passage. The agitator is configured to increase an agitation rate of the quenchant in the internal passage of the conduit.

Alternatively or additionally, the agitator is configured to cause an agitation rate in a portion of the internal passage that eliminates a film boiling process from taking place on a surface of the parts.

Alternatively or additionally, the agitator is configured to cause the agitation rate to be greater than 4 ft/sec.

Alternatively or additionally, the apparatus also includes circuitry configured to adjust the agitation rate caused by the agitator based on required properties of the parts.

Alternatively or additionally, the chute includes openings configured to allow passage of quenchant between an exterior of the chute and an interior of the chute.

Alternatively or additionally, the apparatus additionally includes nozzles configured to increase an agitation rate of the quenchant in the chute.

Alternatively or additionally, the apparatus further includes a pump configured to provide supply quenchant from the tank to the nozzles for increasing the agitation rate of the quenchant in the chute.

Alternatively or additionally, the inner passage includes baffles configured to improve a uniformity of a flow distribution of the quenchant in the internal passage.

Alternatively or additionally, the exit from the quenchant is a surface of the quenchant.

Alternatively or additionally, the conveyor is configured to transport the received parts out of the tank.

Alternatively or additionally, the portion of the conveyor located within the internal passage moves the parts upwardly towards the exit from the quenchant.

Alternatively or additionally, the conveyor includes a variable speed motor configured to alter a speed of the conveyor, such that a dwell time of the parts in the quenchant is varied depending on the speed of the conveyor.

Alternatively or additionally, the apparatus also including circuitry configured to receive properties of the parts and to adjust the speed of the conveyor based on the received properties of the parts.

Alternatively or additionally, the circuitry is configured to adjust the speed of the conveyor such that a temperature of the parts leaving the quenchant is less than a temperature threshold.

Alternatively or additionally, the conveyor includes cleats having openings configured to allow quenchant flow through the cleats to improve a uniformity of cooling of the parts.

According to another aspect of the disclosure, there is provided a method for intensively quenching heated parts. The method includes delivering the parts into a quenchant contained in a tank via a chute. The parts are received from the chute on a conveyor. A portion of the conveyor is located within an internal passage of a conduit. An agitation rate of quenchant in the internal passage increases using an agitator. The received parts are transported towards an exit from the quenchant using the conveyor.

Alternatively or additionally, the increasing of the agitation rate of the quenchant in the internal passage includes increasing the agitation rate in a portion of the internal passage such that a film boiling process is eliminated from taking place on a surface of the parts.

Alternatively or additionally, the agitation rate of the quenchant in the portion of the internal passage is increased to be greater than 4 ft/sec.

Alternatively or additionally, the method also includes increasing an agitation rate of the quenchant in the chute using both nozzles to supply quenchant to the chute and openings in the chute to allow quenchant to exit the chute.

Alternatively or additionally, the method further includes adjusting a speed of the conveyor based on required properties of the parts.

Alternatively or additionally, the speed of the conveyor is adjusted such that a temperature of the parts leaving the quenchant is less than a temperature threshold.

While a number of features are described herein with respect to embodiments of the invention; features described with respect to a given embodiment also may be employed in connection with other embodiments. The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention in which similar reference numerals are used to indicate the same or similar parts in the various views.

Figure 1:
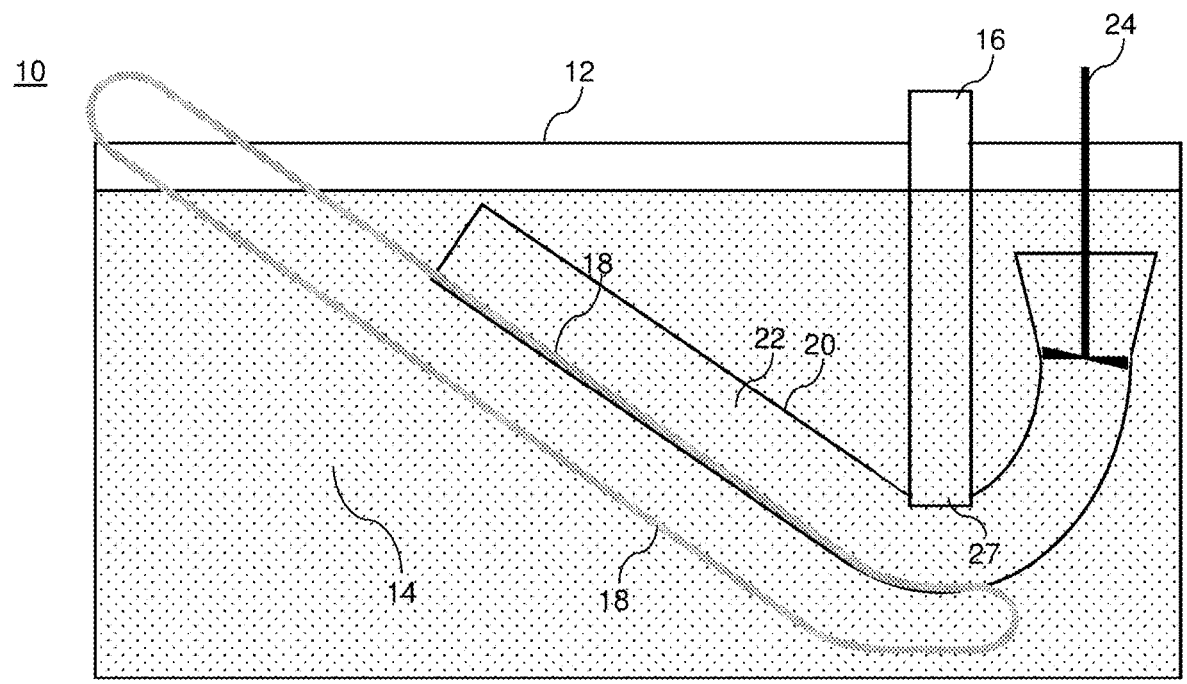
FIG. 1 is a schematic diagram of an embodiment of an intensive quench (IQ) apparatus.

The present invention is described below in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

DETAILED DESCRIPTION

According to a general embodiment, an intensive quenching (IQ) apparatus is provided. The IQ apparatus includes a chute for placing parts into a tank including liquid quenchant. The parts fall through the quenchant in the chute and are received by a conveyor belt. The parts are then transported on the conveyor through an inner channel of a conduit. An agitation rate of the quenchant in the inner channel is increased by an agitator.

Turning to FIG. 1 an IQ apparatus 10 is shown including a tank 12 containing a liquid quenchant 14, a chute 16, a conveyor 18, a conduit 20 having an internal passage 22, and an agitator 24. Parts 26 pass into the quenchant 14 via the chute 16 and are deposited onto the conveyor 18. The conveyor 18 transports the parts 26 along the conveyor 18 through the internal passage 22. Quenching of the parts 26 in the internal passage 22 is improved by the agitator 24 increasing the agitation rate of the quenchant in the internal passage 22.

The tank 12 may be made of steel or any suitable material for containing the quenchant 14. The quenchant in the tank 12 may have a temperature within the range of the ambient temperature to approximately 120° F. A depth of the quenchant 14 may be approximately 40 inches. In one embodiment, the depth of the quenchant depends on the properties of the quenchant (e.g., thermal capacity) and the properties of the parts being cooled (e.g., volume, temperature, etc.). The tank 12 may include a temperature controller (e.g., a cooler) configured to maintain a temperature of the quenchant 14 in the tank 12 below a predetermined temperature.

The quenchant 14 may be any suitable solution for cooling the parts 26. In one embodiment, the quenchant 14 may be a solution of mineral salts (e.g., sodium nitrite) in water or organic salts (e.g., Daphne IntensiQuench™) in water, both having a concentration of 5-20%. In another embodiment, the quenchant 14 may be an aqueous solution of organic polymer (e.g., UCON™) having a typical concentration of 1-20%.

Figure 2:
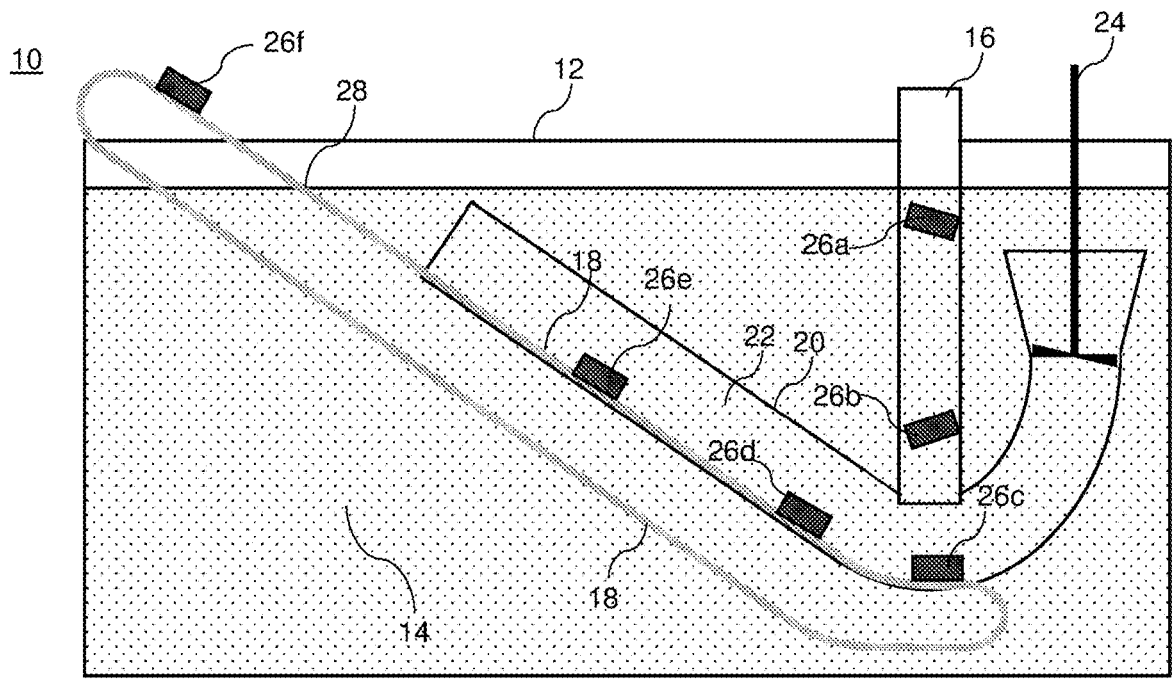
FIG. 2 is a schematic diagram of the IQ apparatus of FIG. 1 including parts being quenched.

As shown in the embodiment depicted in FIG. 2, the parts 26 are introduced into the quenchant 14 via the chute 16 and the chute 16 is at least partially filled with quenchant 14. Part 26a is shown just after entering the quenchant 14 and as the part 26a is falling towards the conveyor 18. Part 26b is further down the chute 16 and is approaching the conveyor 18. Part 26c has reached the conveyor 18 below an exit 27 of the chute 16. Part 26d has begun to move along the conveyor 18 towards an exit 28 from the quenchant 14. Part 26e is further along the conveyor 18 towards the exit 28. Part 26f has exited the quenchant 14 and is reaching the end of the conveyor 18. For example, the parts 26 may be dropped from the conveyor 18 onto another actuator (e.g., another conveyor) for further transport of the parts 26 after exiting the quenchant 14.

While the IQ apparatus 10 is shown having a single chute 16, the IQ apparatus 10 may have one or more chutes 16. The number of chutes, the configuration of the chutes, and dimensions of the chutes may depend on the production setup. For example, if parts are corning from a continuous furnace, the IQ apparatus 10 may include one chute having a width slightly exceeding a width of the working space of the furnace (e.g., the chute width may be approximately 30 inches). In another example, if the parts 26 are coming from hot forming presses, the number of chutes may be equal to the number of hot forming presses. In this example, the exit 27 of each of the chutes may be near the same location on the conveyor 18 so that the parts 26 have approximately the same transit time along the conveyor 18 to the exit 28 from the quenchant 14. In another example, dimensions of the chute 16 may be determined by dimensions of the parts 26 (e.g., chute cross sectional dimensions may be 6×6 inches for parts less than 6 inches along their largest dimension).

Figure 3:
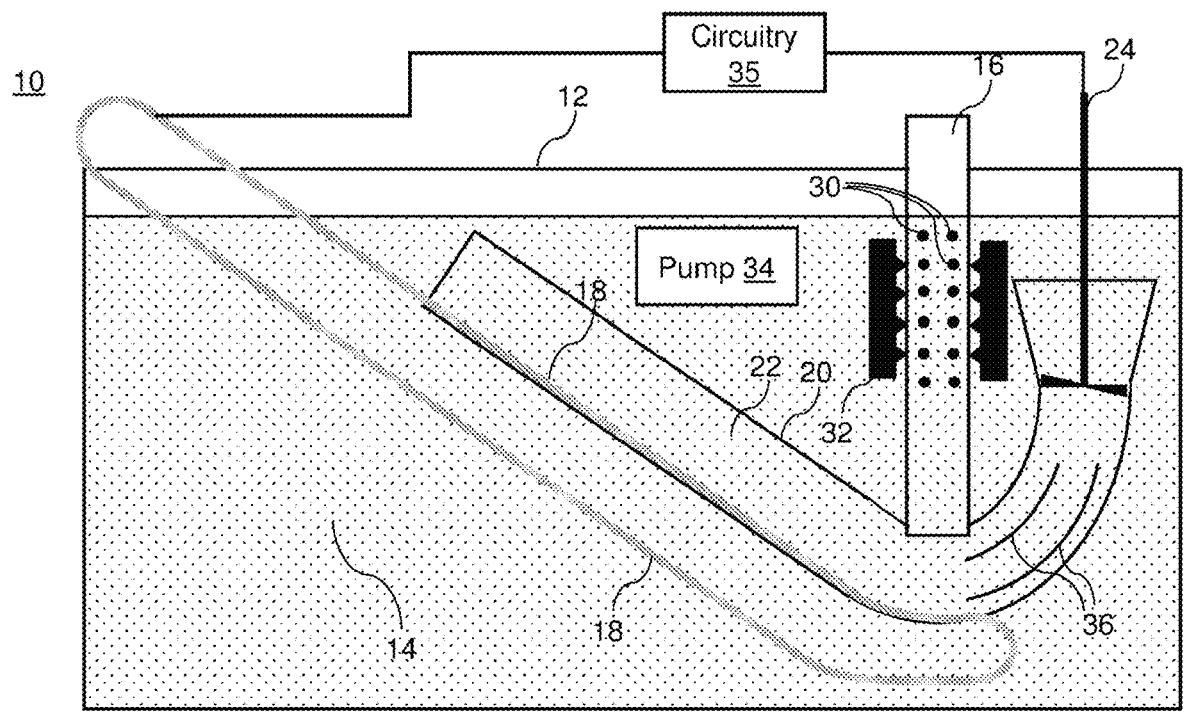
FIG. 3 is a schematic diagram of an alternative embodiment of the IQ apparatus.

In the embodiment shown in FIG. 3, the chute 16 includes openings 30 for improving quenchant circulation within the chute 16. The openings 30 are configured to allow passage of quenchant 14 between an exterior of the chute 16 and an interior of the chute 16. For example, openings 30 may be located below a surface of the quenchant (also referred to as the quenchant level). The number of openings 30 and size of the openings 30 may be dependent upon the properties of the chute 16, the quenchant 14, and/or the parts 16 being quenched.

In the embodiment depicted in FIG. 3, the chute 16 additionally includes nozzles 32 for further improving quenchant agitation in the chute 16. The nozzles 32 are configured to avoid the initiation of a non-desired film boiling process on a surface of the part 26 when the part 26 is falling through the chute. For example, the nozzles 32 may be used when quenching relatively thin parts (e.g., having a thickness of approximately ½ inch). The nozzles 32 may be positioned on one or more sides of the chute 16. In the depicted embodiment, the nozzles 32 are positioned on opposite sides of the chute 16 (e.g., in a staggered or aligned arrangement).

A quenchant flow through the nozzles 32 may be provided by a pump 34 that moves the quenchant from the tank 12 through the nozzles 32 into the chute 16 and through the chute openings 30 back into the tank 12. As will be understood by one of ordinary skill in the art, a portion of the quenchant 14 flowing through the nozzles 32 may flow down the chute 16 and merge with the quenchant flow provided by the agitator 24 in the inner channel 22. In one embodiment, the quenchant flow velocity from the nozzles 32 may be approximately 3-15 ft/sec. The quenchant flow velocity from the nozzles 32 may depend upon properties of the chute 16 and/or the parts 26.

The conveyor 18 is configured to transport the parts 26 towards an exit 28 from the quenchant 14. For example, the conveyor 18 may transport the parts 26 to an actuator (such as a lift or another conveyor) that removes the parts 26 from the tank 12. Alternatively, as shown in FIGS. 1-3, the conveyor 18 may carry the parts 26 out of the tank 12. In one embodiment, the conveyor 18 is inclined at an angle towards a surface of the quenchant 14. The conveyor 18 may be inclined at any suitable angle. For example, the angle may be approximately 25° (e.g., 15-35°).

In one embodiment, the conveyor 18 includes a variable speed motor configured to move the conveyor 18 at a speed that is dependent upon the properties of the part 26 being transported. For example, a shape and thickness of the part 26 may affect the time required to properly quench the part. For this reason, the speed of the conveyor 18 may be adjusted using the variable speed motor based upon such properties. As an example, the IQ apparatus 10 may include circuitry 35 configured to adjust the agitation rate caused by the agitator based on properties of the parts 26. In one example, the circuitry 35 controls the speed of the conveyor 18 such that a temperature of parts 26 leaving the quenchant 14 is less than a threshold temperature (e.g., 400° F.). In one example, the speed of the conveyor 18 is approximately 0.5-3 ft/sec. As will be understood by one of ordinary skill in the art, a length of the conveyor 18 and the speed of the conveyor 18 both affect the dwell time of the parts 26 in the quenchant 14. For this reason, the speed of the conveyor 18 may also be based on properties of the conveyor 18 (such as length). The speed of the conveyor 18 may be set such that the minimum dwell time of each part 26 in the quenchant 14 is at least 3 seconds. In one embodiment the speed of the conveyor 18 is set such that the dwell time of each part 26 is between 7 and 20 seconds.

The circuitry 35 may have various implementations. For example, the circuitry 35 may include any suitable device, such as a processor (e.g., CPU), programmable circuit, integrated circuit, memory and I/O circuits, an application specific integrated circuit, microcontroller, complex programmable logic device, other programmable circuits, or the like. The circuitry 35 may also include a non-transitory computer readable medium, such as random access memory (RAM), a read-only memory (ROM), an erasable programmable read-only memory (EPROM or Flash memory), or any other suitable medium. The circuitry 35 may be communicatively coupled to the computer readable medium and network interface through a system bus, mother board, or using any other suitable structure known in the art.

As shown in FIGS. 1-3, a portion of the conveyor 18 is located within the internal passage 22 of the conduit 20. The internal passage 22 is at least partially filed with the quenchant 14. The agitator 24 is configured to increase an agitation rate of the quenchant in the internal passage 22. For example, the agitator 24 may be a rotating propeller positioned to direct a flow of the quenchant 14 into the internal passage 22. By increasing an agitation rate of the quenchant in the internal passage, the agitator 24 affects the quenching of parts 26 being transported by the conveyor 18 in the internal passage 22. For example, the agitator 24 may rotate at a speed of 300 rpm, providing a quenchant agitation rate in at least a portion of the internal passage 22 of approximately 2-8 ft/sec. The agitator 24 may provide an agitation rate that eliminates a film boiling process (which can unfavorably affect part distortion and microstructure) from taking place on a surface of the part at the beginning of the quench. For example, the agitator 24 may agitate the quenchant 14 at a rate of greater than 4 ft/sec, greater than 6 ft/sec, between 2 and 8 ft/sec, or between 4 and 8 ft/sec.

Turning to FIG. 3, the conduit 20 may additionally include baffles 36 for providing a more uniform flow distribution of quenchant in the internal passage 20 (as compared to when baffles 36 are not present) to improve uniform cooling of parts 26 being transported by the conveyor 18 in the internal passage 20. For example, the conduit 20 may be a tube having an opening for receiving the conveyor 18 at a bottom portion and an exit from which the conveyor 18 exits the conduit 20 at an upper portion. The conduit 20 may also have another opening nearer the agitator 24 for allowing quenchant to enter the conduit 20. The baffles 36 may be positioned in a portion of the internal passage 22 through which the parts 26 are not transported (e.g., a portion to the right of the chute 16 as shown in FIG. 2).

Figure 4:
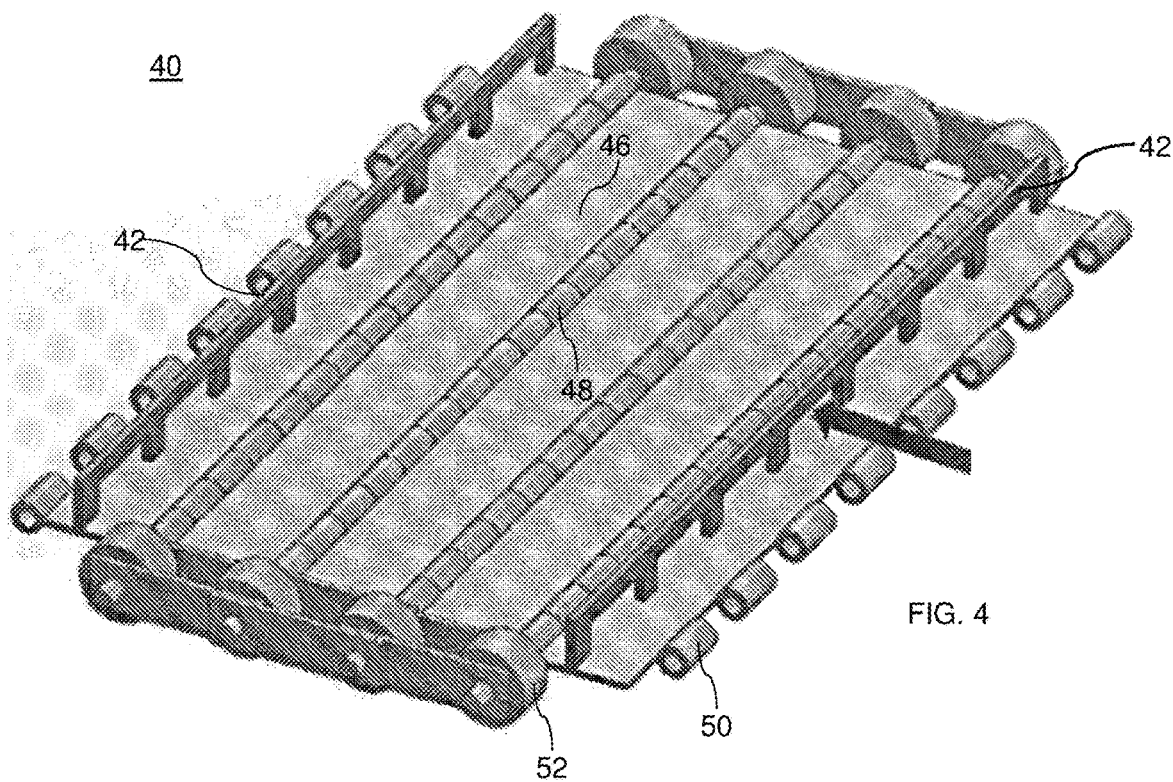
FIG. 4 is diagram of an exemplary embodiment of a cleat of a conveyor of the IQ apparatus.

Turning to FIG. 4, the conveyor 18 may be formed from a belt consisting of a set of pans (also referred to as plates) 46 and traction structures 48. The traction structures 48 may be protrusions extending from the pan 46. Each pan 46 may engage with another pan 46 using engaging structures 50 (e.g., hinges) located at edges of the pan 46. The conveyor 18 may roll along a support structure using wheels 52. To elevate the part 26 being transported from the conveyor belt for better uniformity of cooling, the cleats 42 may be used. The cleats 42 may be attached to the pans 46. The cleats 42 may include openings to allow the quenchant 14 to flow (represented by the black arrow) freely along the conveyor belt to improve a uniformity of cooling of the parts 26 supported by the cleats 42.

A spacing (a distance) between cleats 42 may be determined based on a size of the parts 26 being transported, such that a slippage of the parts 26 down the conveyor 18 during transport is reduced.

The IQ system 10 may be used to cool parts of various temperatures, shapes, and sizes. For example, the parts 26 may have a temperature of approximately 1,500° F. (e.g., 1,200-1,800° F.). The parts 26 may have a minimum thickness of approximately ½ inch (e.g., 0.25-1 inch) and may be exiting any heating machine. For example, the heating machine may be a continuous heat-treating furnace, forging press, or any other hot forming machine. The parts 26 similarly be made of any suitable material. For example, the parts 26 may be made of at least one of plain carbon steels (e.g., 1040 steel), alloy steels (e.g., 5160 steel), or high-alloy steel (e.g., 4330 steel).

Figure 5:
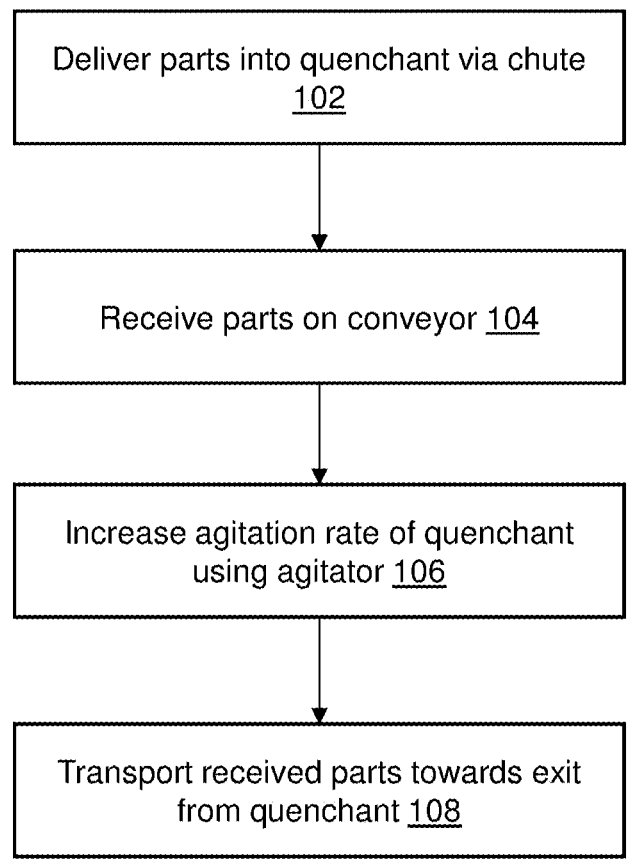
FIG. 5 is a flow diagram of a method for intensively quenching parts.

FIG. 5 depicts an embodiment of a method 100 for intensively quenching heated parts. In process block 102, parts 26 are delivered into the quenchant 14 contained in the tank 12 via the chute 16. In process block 104, the parts 26 from the chute 16 are received on the conveyor 18. In process block 106, the agitation rate of the quenchant 14 in the internal passage 22 is increased using the agitator 24. In process block 108, the received parts 26 are transported towards an exit 28 from the quenchant 14 using the conveyor 18.

All ranges and ratio limits disclosed in the specification and claims may be combined in any manner. Unless specifically stated otherwise, references to "a," "an," and/or "the" may include one or more than one, and that reference to an item in the singular may also include the item in the plural.

Although the invention has been shown and described with respect to a certain embodiment or embodiments, equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method for intensively quenching heated parts, the method comprising: delivering the parts into a quenchant contained in a tank via a chute; receiving the parts from the chute on a conveyor, wherein a portion of the · conveyor is located within an internal passage, with a constant cross-sectional area, of a conduit and encircled by the conduit; providing a constant quenchant flow velocity in the internal passage using an agitator, wherein the agitator causes the quenchant flow velocity in the internal passage of the conduit to be greater than a quenchant flow velocity outside the conduit; and transporting the received parts towards an exit from the quenchant using the conveyor.

2. The method of claim 1, wherein the quenchant flow velocity is provided in a portion of the internal passage such that a film boiling process is eliminated from taking place on a surface of the parts.

3. The method of claim 2, wherein the quenchant flow velocity in the portion of the internal passage is greater than 4 ft/sec.

4. The method of claim 1, further comprising increasing the quenchant flow velocity in the chute using nozzles to supply quenchant to the chute and openings in the chute to allow quenchant to exit the chute.

5. The method of claim 1, further comprising adjusting a speed of the conveyor based on properties of the parts.

6. The method of claim 5, wherein the speed of the conveyor is adjusted such that a temperature of the parts leaving the quenchant is less than a temperature threshold.

\* \* \* \* \*